May 13, 1969  W. S. FORTUNE  3,443,734
SOLDER-DESOLDER COMBINATION IMPLEMENT
Filed Oct. 24, 1967  Sheet 1 of 2

William S. Fortune
INVENTOR.

BY Daniel T. Anderson
ATTORNEY

May 13, 1969 W. S. FORTUNE 3,443,734
SOLDER-DESOLDER COMBINATION IMPLEMENT
Filed Oct. 24, 1967 Sheet 2 of 2

William S. Fortune
INVENTOR.

BY Daniel T. Anderson
ATTORNEY

United States Patent Office 3,443,734
Patented May 13, 1969

---

3,443,734
SOLDER-DESOLDER COMBINATION IMPLEMENT
William S. Fortune, 14250 Dearborn Ave.,
Panorama City, Calif. 91402
Filed Oct. 24, 1967, Ser. No. 677,638
Int. Cl. B23k 3/06
U.S. Cl. 228—52    10 Claims

ABSTRACT OF THE DISCLOSURE

The specification discloses a desoldering tool having a hollow, tubular cylindrical configuration with a spring loaded piston housed therewithin. The forward end of the cylindrical body is provided with a small diameter hollow tip; and a cocking plunger protrudes from the opposite, or rear, end. A tip self-cleaning rod extension member carried by the piston extends into and slightly beyond the forward end of the hollow tip during the cocking stroke and is carried rearwardly by the piston during its flyback or vacuum stroke. The rod extension member comprises a concentric pair of conductors joined at their extremity in a resistance junction. When the conductors are energized, the junction substantially instantly reaches a solder fusing temperature and may be used as a solder or desoldering tip; when the latter, a vacuum stroke is achieved when the desired degree of solder melting has been accomplished, and the molten solder is drawn into the internal volume of the implement through its hollow small diameter forward tip.

---

This invention relates generally to the field of soldering and more particularly to improvements in hand held tools which provides, selectively, both solder fusing temperatures and a vacuum stroke for removing, when desired, the molten solder from the work.

Background of the invention

Although the present invention finds particularly useful application in the field of soldering and desoldering of electronic wiring terminals as in printed circuitry and the like, and although, in the cause of clarity and brevity, much of the following discussion and description of examples relate thereto, it is expressly to be understood that the advantages of the invention are equally well manifest in other fields of endeavor wherein it is desired to heat selectively, withdraw the heating tip, and rapidly draw a pulse of air over the heated area.

In electrical circuit wiring both in the manfuacturing and in the research and development of electrical and electronic equipment as well as in maintenance, repair, modification, and rebuilding thereof, the advantages and the needs for tools for desoldering have become quite well known in recent years. In prior years the typical practice, when changing or removing soldered connections, was either to remove the connection by application of considerable force without melting the solder, or to melt the solder and attempt to part the connection before the solder rehardened. Other techniques involved melting the solder and then removing it by shaking the chassis or other circuit base or drawing it onto the hot iron by gravity flow or by blowing the molten solder away from the connection. The disadvantages and limitations of each of these techniques with modern delicate, compact, and sophisticated circuitry are obvious.

One prior art approach which solves some of the above problems is to provide a central vacuum system and a duct terminating in the vicinity of the worker. When the solder is melted, the duct end is placed at the connection and the molten solder removed. Such systems are costly, awkward to use, difficult to cleans and maintain, and are not readily, if at all, portable.

Still other prior art approaches have involved the use of a hand held vacuum stroke implement which is held in one hand while the operator holds a soldering tool in the other. When the solder is melted, it may be drawn off by an impulse of air forced into the vacuum implement. Although this approach provides highly useful results with simple, portable, inexpensive, and versatile tools, it requires the full simultaneous use of both hands for the desoldering operation. This is, at best, awkward and often impractical where access does not simultaneously permit use of both hands and two tools. In addition, the operator must purchase, maintain and keep track of two separate tools for a single, relatively simple operation.

Accordingly, it is an object of the invention to provide novel local heater-vacuum stroke or solder-desolder apparatus which is not subject to these and other disadvantages and limitations of the prior art.

It is another object to provide such apparatus which is readily embodied in a single, compact tool easily held and operated with one hand.

It is another object to provide substantially instant electric heating soldering iron apparatus requiring only a few watts of input energy.

It is another object to provide solder-desolder apparatus which is totally cool and thermally safe to handle while providing substantially instant local heating and instant desoldering.

It is another object to provide such apparatus which is electrically exceedingly safe to handle and operate.

It is another object to provide such apparatus which requires very low magnitudes of electrical power and which is especially efficient as regards electrical energy input versus soldering or desoldering "output."

It is another object to provide such apparatus which is not subject to operational degradation due to aging effects, corrosion of the hot tip, or the like.

It is another object to provide such apparatus which is substantially automatically self cleaning.

It is another object to provide such apparatus in which a single control button or trigger controls selectively both soldering and desoldering operations.

Summary of the invention

Briefly, these and other objects are achieved in accordance with the structural aspects of one example of the invention which includes a tubular body with a reduced diameter forward end formed by a hollow tip extension. A cocking plunger is disposed within the tubular body and carries a piston near its forward end. At its rearward end an actuating portion is provided for manually cocking the device by displacing the piston forwardly preparatory to achieving a desired solder removing vacuum stroke. Latching and trigger actuated unlatching means are provided for the piston plunger.

An electrically energizable hot tip assembly is carried by the plunger and extends forwardly from the piston so that, when the latter is cocked and latched in its forward position, the hot tip assembly extends through the forward hollow tip and is exposed somewhat therebeyond. The hot tip assembly comprise an outer, small diameter encasing tip electrode and an inner smaller diameter rod electrode which makes a resistive junction with the inner surface of the encasing electrode very near its tipe end. Electrical continuity between the terminals of a low voltage source and these electrodes is provided through leads affixed to the implement.

During the cocking stroke when the piston is displaced forwardly, the entry and passage of the hot tip extension assembly through the hollow tip of the body member automatically cleans the vacuum inlet port of hardened bits of solder residual from the previous vacuum stroke.

Further details of these and other objects and advantages of the invention as well as description of additional features such as, for example, a trigger release mechanism which also functions as a momentary contact switch for energizing the hot tip, and alternative arrangements of the invention will become apparent and be best understood from the following discussion and description when considered in connection with the following drawings which are presented by way of example only.

*Description of the preferred embodiment*

With specific reference now to the figures in detail, it is stressed that the particulars shown are by way of example and for purposes of illustrative discussion only, and are presented in the cause of providing what is believed to be the most useful and readily understood description of the principles and structural concepts of the invention. In this regard, no attempt is made to show structural details of the apparatus in more detail than is necessary for a fundamental understanding of the invention. The description, taken with the drawings, will make it apparent to those skilled in the art how the several forms of the invention may be embodied in practice. Specifically, the detailed showing is not to be taken as a limitation upon the scope of the invention which is defined by the appended claims forming along with the drawings, a part of this specification.

Figure 1:
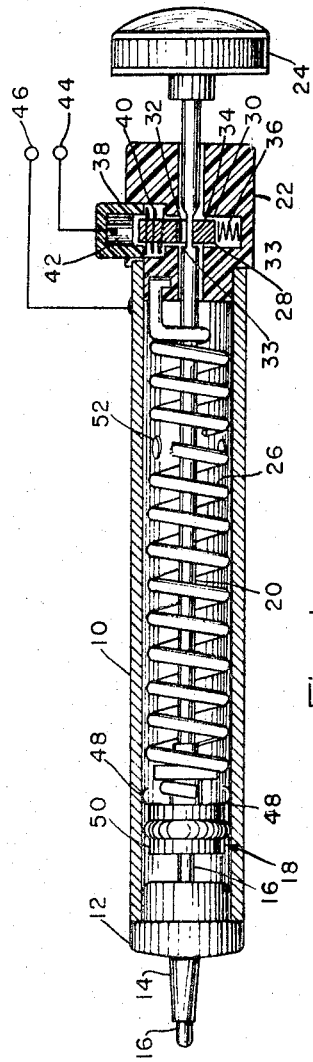
FIGURE 1 is a longitudinal sectional view of a portion of an example of a solder-desolder combination implement constructed in accordance with the principles of the present invention.

Referring to FIGURE 1, the example illustrated includes an elongate cylindrical body member 10 having a forward tip element 12 with a hollow, small diameter extension portion 14. The extension portion forms a protective shroud concentrically over a small diameter hot soldering tip 16 which is carried by a piston assembly 18 which may travel axially along the major portion of the length of the body member 10. Extending rearwardly from the piston assembly 18 is a plunger rod 20 which passes centrally through a rear bushing member 22 and terminates externally of the body member 10, in a cushioned plunger cap 24.

A tension coil spring 26 is affixed at its ends to the piston assembly 18 and the rear bushing member 22. When the piston is displaced forwardly by pushing axially inwardly on the plunger rod, work is done against and stored by the spring 26, which is held in tension by a trigger member 28 held within a lateral trigger retainer bore 30 in the rear bushing member 22. The plunger rod 20 passes through the trigger member 28 which is provided for such purpose, with an oversize, plunger rod receiving bore 32. The lower edge of the bore 32 lockingly engages the shoulder 33 of the circumferential latching notch 34 by action of a trigger spring 36 which is compressed, transversely, or laterally, with respect to the axis of the body member 10. An insulated trigger button 38 is provided, as shown schematically, which, when depressed, firstly against a spring 40 and secondly against the relatively stronger trigger spring 36, first causes the electrical connection of a metal insert 42 with the top of the metal trigger member 28 and second, when sufficient force is applied by the operator, causes rearward release of the shoulder 33 of the latching notch 34 through the plunger rod receiving bore 32.

Thusly, electrical connection is made from a lead 44 through the insert 42 to which it is connected as indicated, through the trigger member 28 and the metallic plunger rod 20 to the piston assembly 18. The opposite electrical lead 46 is connected, as indicated, to the metallic body member 10, and through a set of sliding electrical contacting elements 48 which are carried by the piston body 50. The two electrical lines are further connected within the piston assembly 18 to the electrodes of the soldering hot tip 16 as shown in detail in a subsequent figure. It is sufficient here to point out that with the tool in a cocked state, as shown, and with the leads 44, 46 energized, substantially instant heat is provided at the outer extremity of the hot tip 16. The hot tip is protectively shrouded by the extension portion 14 which may be made of a thermally and electrically insulative material such as Teflon which has the further advantage of non-adherence with molten solder and thus is easily cleaned by the tip element 16 automatically during the cocking stroke of the plunger memebr 20. In a desoldering sequence, once the solder to which the tip is applied is made molten thereby, the trigger button 38 may be further depressed to create a high impulse vacuum stroke by the flyback action of the piston assembly 18. Air in back of the piston assembly 18 is released through apertures 52 provided as shown, in the side wall portion of the body member 10. When the piston passes rearwardly of the apertures, the trapped air assists in providing a smooth deceleration of the piston assembly. This action draws the molten solder into the body member 10 thusly desoldering the connection or terminal as desired. The interior of the body member 10 may be oiled whereby the solder bits will not stick thereto and may be readily removed when desired by ejecting the forward tip element 12 from the body member 10. This may be accomplished by pushing the plunger rod 20 further forward than required for the normal cocking stroke.

Figure 2:
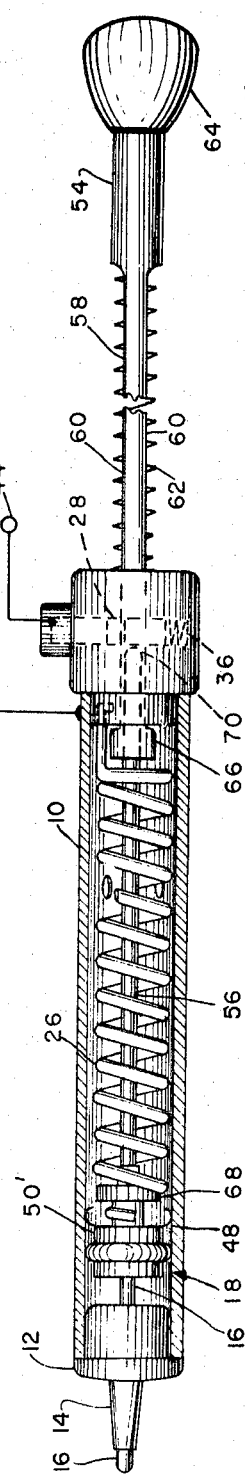
FIGURE 2 is a longitudinal sectional view of a portion of an alternative example of the invention.

Referring to FIGURE 2, the example of the invention illustrated may be considered as being generally similar to that of FIGURE 1 in essential respects except that the piston assembly 18′ is separate from the cocking plunger 54 and includes a low mass, holding, stem element 56 carried by the plunger body 50′. The cocking plunger 54 consists, in this example, primarily of a hollow, tubular body 58 from which along its mid portion a pair of elongate slots 60 have been removed to allow axial passage of the tubular body 58 past the trigger member 28 which is disposed laterally therethrough. A cocking plunger return spring 62 is retained compressively between the trigger member 28 and a plunger cap member 64.

During the cocking stroke, in this example, the forward end 66 of the cocking plunger 54 engages the rear portion 68 of the piston body 50′ and drives it forwardly until the rear tip 70 of the holding, stem element 56 passes entirely through the bore in the trigger member 28, and its spring 36 urges it upwardly to latch the piston assembly in its forward, cocked disposition as shown. The cocking plunger may then be released, and the return spring 62 will carry it to its rearward position as shown.

The electrical connections and trigger release functions may be essentially as described above in connection with FIGURE 1. Some advantages accrue, however, with embodiments constructed along the lines depicted in FIGURE 2 in that the mass of the piston assembly may be much less and the cocking plunger and plunger cap member do not flyback during the vacuum stroke. The former permits the use of a stronger spring 26 and a higher velocity for the piston without as great an impulse of momentum being imparted to the outer body and forward tip element of the tool during the vacuum stroke. The latter affords a safety feature in that the face or eye of the operator cannot be injured by any flyback of the cocking plunger mechanism.

Figure 3:
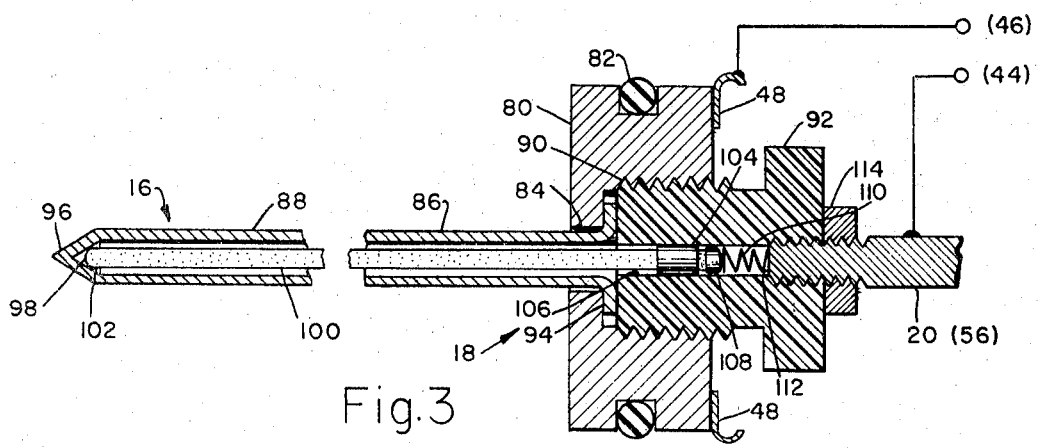
FIGURE 3 is a more detailed longitudinal sectional view of an example of a soldering tip portion of the invention.

Referring to FIGURE 3, an example of the piston assembly 18 of the previous figures is shown in more detail as including the piston body 80 carrying a rubber or neoprene O-ring 82 and the electric contacting fingers 48. In this example, the piston body may be fabricated of aluminum or a similar light weight alloy and the fingers 48 of a material such as a beryllium copper alloy. The piston body is centrally bored at 84 to receive the elongate outer, encasing body portion 86 of the outer electrode 88 of the hot tip 16. The piston body is also counter bored and threaded at 90 to receive a threaded, insulated bushing element 92 and retain thereby a flange base portion 94 of the body portion 86 of the outer electrode 88.

The elongate body portion 86 of the outer electrode 88 is essentially a thin walled conductive sleeve terminated at its forward end in a soldering tip portion 96 which may be appropriately electroplated for minimizing corrosion and maximizing heat transfer to the solder to be fused. The inner cylindrical surface of the elongate portion 86 is terminated by a concave conical bottom which is adopted to receive and maintain centered the forward end 98 of a carbon rod inner electrode 100 and create in combination therewith a resistive heat generating junction 102.

The rear, or base, end of the carbon rod electrode may be centered by a sleeve element 104 carried by an inner bore 106 provided axially through the bushing member 92 and is, in this example press fitted with a highly conductive terminal cap 108 to minimize the resistance of current flow between the carbon rod and a contact biasing spring 110. The spring is compressively retained between the forward end 112 of the plunger rod 20 (or 56) which is threaded into the bore 106 and secured by a lock nut 114 as shown.

In operation, electrically, current from the terminals 44, 46 suffer only very low resistance paths to the junction 102; accordingly there is substantially no I²R loss or heat generated except at the junction which is immediately contiguous to the soldering interface of the tip 96. In addition, heat flow rearwardly from the tip must flow along either the carbon rod or the sleeve portion 86 both of which are elongate, of small cross section, and in the case of the carbon rod, composed of thermally resistive material. Hence, the tip apparatus is doubly efficient: heat is generated only where needed; and what is generated is not wasted by conduction away therefrom. This causes the overall tool to be thermally exceedingly comfortable and safe to use and minimizes the electrical power requirement. In this regard, it is pointed out that two to five watts input is found adequate for substantially all electronic circuit solder and desolder applications. Furthermore, the very low voltage requirements cause the implement to be totally safe as regards any shock hazard.

Figure 4:
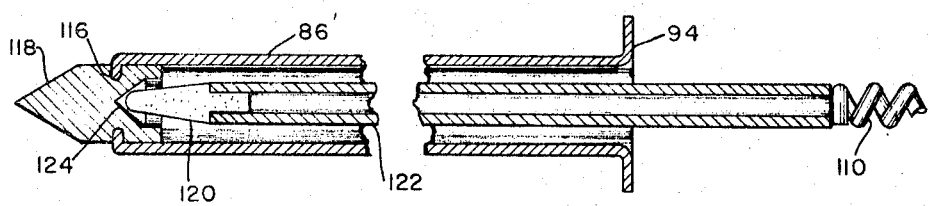
FIGURE 4 is a similar view of an alternative example of a soldering tip arrangement of the invention.

In FIGURE 4 an alternative example of the tip assembly is illustrated which includes an elongate sleeve body 86' which may be fabricated of stainless steel to exhibit adequate electrical conductivity and mechanical strength and minimum thermal conduction. The forward end of the sleeve body 86' may be circumferentially crimped inwardly, as shown at 116, to retain supportingly a plated copper tip electrode 118.

The rear surface of the tip electrode 118 is conically bored, as shown, for supporting and centering an inner carbon electrode element 120. The carbon element is press fit into the end of an elongate inner conductor sleeve member 122 and is tapered to a smaller diameter forwardly whereby the temperature gradient along the carbon from the resistance junction 124 rearwardly is further increased.

Figure 5:
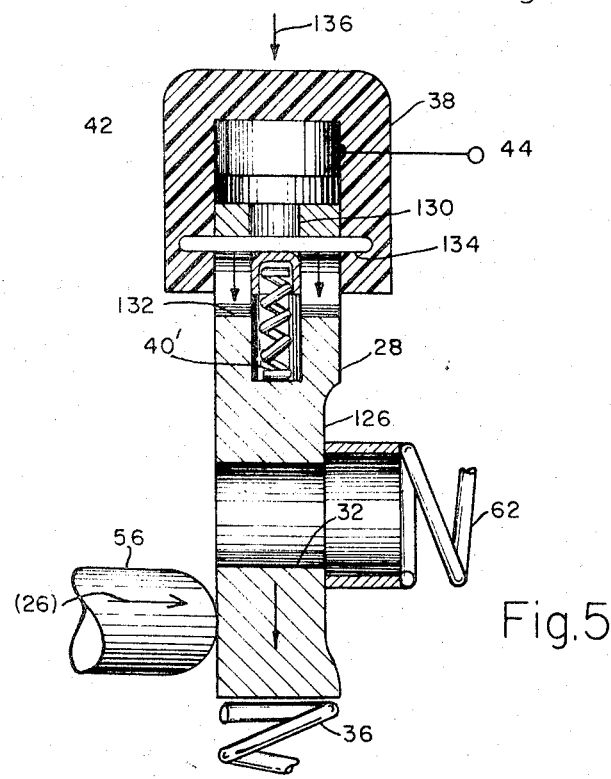
FIGURE 5 is a detailed sectional view of an example of a control button portion of the invention.

Referring to FIGURE 5, some further details of an example of the trigger and latching mechanism are illustrated. The trigger member 28 is substantially cylindrical having a transverse plunger rod receiving bore 32 provided therethrough as previously indicated. The trigger member is shown displaced upwardly by action of the compressed trigger spring 36 thereby holding the plunger stem element 56 forwardly against the tension of the main spring 26 as indicated by the resultant force arrow 26.

The rear surface of the trigger member 28 is flattened at 126 to receive a short sleeve 128 which is urged thereagainst by the cocking plunger return spring 62. This action secures the trigger member from rotation when the plunger guide element 56 is not disposed within the bore 32. The upper end of the trigger member 28 is bored at 130 to receive the compressed, trigger cap spring 40'. A vertically elongated slot 132 is provided for retaining and guiding a cap retainer pin element 134 which is carried, as shown by the cap element 38. Thus the cap element 38 is urged upwardly to open, normally, the electrical connection between the conductor insert 42 and the top of the trigger member 28.

In operation, as outlined above, force applied as indicated at 136 first causes further compression of the spring 40' and electrical connection from the terminal 44 to the plunger guide element 56, and secondly causes further compression of the trigger spring 36 to permit vacuum stroke flyback of the element 56 through the bore 32.

Figure 6:
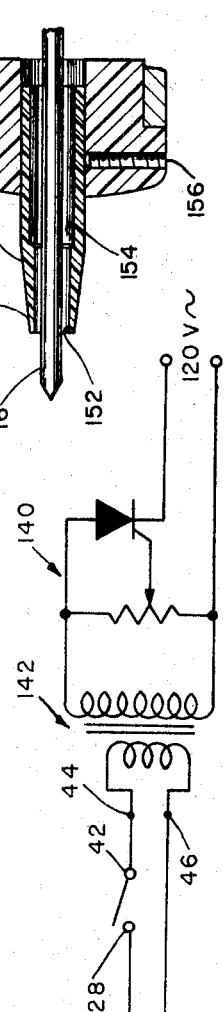
FIGURE 6 is a schematic diagram illustrating an example of electrical energization in accordance with the principles of the invention.

In FIGURE 6 an example of the electrical power supply constructed in accordance with the features of the invention is illustrated. Sixty cycle power of 120 volt amplitude is applied through a silicon controlled rectifier 140 to the primary terminals of a step down transformer 142 of turns ratio approximately 12:1. The secondary windings may accordingly supply voltage of from zero to approximately 10 volts and supply it through the terminals 44, 46 to the momentary contact trigger switch 42–28 and thence to the hot tip electrode assembly indicated at 16. Thusly, by adjustment of the SCR circuit and manipulation of the trigger switch the solder fusing functions of the implement are achieved with considerable flexibility and total control by the operator.

Figure 7:
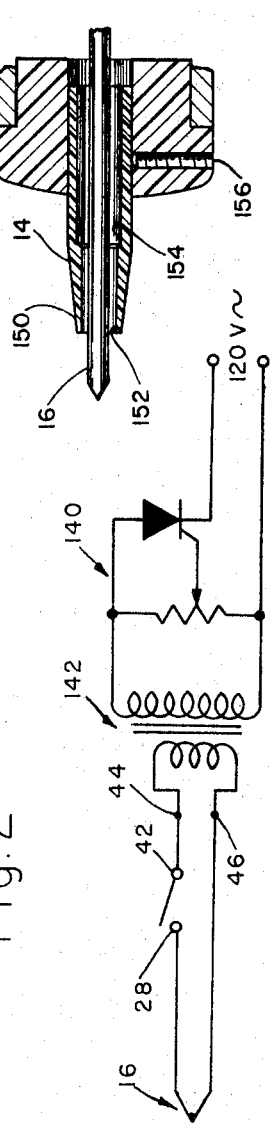
FIGURE 7 is a sectional view of an example of the forward tip portion of the invention.

Referring to FIGURE 7, an example of the tip element 12 is shown in which the extension portion 14 is a separate adjustable shroud element having a forward, tapered tip 150 and small diameter input duct 152 which is counterbored at 154 from the rear as shown. The smaller diameter, forward bore is sized for optimum impulse air flow during the vacuum stroke; and the counterbore provides additional clearance for the solidified bits and pieces of solder which have been drawn in by the vacuum stroke. It may be noted that the magnitude of the clearance in diameter between the soldering tip 16 and the smaller bore of the input duct 152 is shown exaggerated in the figure.

The tube extension portion 14 may be adjusted in its axial disposition by loosening a set screw 156 and then resecuring it after the desired position is selected. By this means, the degree of extension of the tip 16 beyond the shroud 14 may be readily adjusted to suit the technique of the operator as well as to compensate for any wear or errosion of the tip 16.

There have thus been disclosed and described a number of examples and other alternative features of a solder-desolder combination implement which achieves the objects and exhibits the advantages set forth hereinabove.

What is claimed is:

1. Combination solder-desolder implement comprising:
    elongate body having a tubular portion with a reduced diameter hollow forward tip portion;

piston means disposed axially slidably within said tubular portion;

energy storage means coupled to said piston means against which work is done when said piston means is displaced axially forwardly to a position axially relatively contiguous to said forward tip portion;

latching means carried by said body and engageable with said piston means for holding it in such relatively forward position;

trigger means carried by said body actuable for selectively releasing said latching means; and electrically energizable soldering tip means carried by said piston means and extending axially centrally forwardly therefrom and through said hollow forward tip portion when said piston means is displaced in said relatively forward position and being removed rearwardly therefrom when said trigger means is actuated to release said latching means.

2. The invention according to claim 1 which further comprises electrical energy input means carried by said body for selectively momentarily energizing said soldering tip means.

3. The invention according to claim 2 in which said electrically energizable soldering tip means comprises: an outer conductive small diameter sheath member connected supportingly to said piston means and terminated in a closed soldering tip configuration portion; and an inner carbonaceous electrode disposed concentrically within said sheath member having a forward tip portion disposed in electrically resistive junction relation with said closed, soldering tip configuration portion.

4. The invention according to claim 3 in which said electrical energy input means comprises sliding electrical first connection means carried by said piston means for electrically coupling said outer conductive sheath member to said tubular portion of said elongate body.

5. The invention according to claim 4 in which said trigger means includes momentary electrical contact means for coupling electrical energy, when desired, through said latching means to said inner electrode of said soldering tip means when said piston means is disposed in said relatively forward position.

6. The invention according to claim 5 which further includes electrical second connection means carried by said piston means and extending rearwardly therefrom and electrically connecting said inner electrode of said soldering tip means to said latching means when said piston means is disposed in its said forward position.

7. The invention according to claim 1 which further includes piston cocking means for displacing said piston means forwardly toward said hollow tip portion, said piston cocking means being actuable externally of said body.

8. The invention according to claim 1 in which said piston means includes a piston body and a guide shaft member carried thereby and extending axially centrally rearwardly thereof, and which further comprises: bushing means disposed along said elongated body oppositely from said hollow tip portion for housing said latching means and defining an axial aperture for receiving said guide shaft therethrough; piston cocking shaft means extending with axial freedom of movement through said aperture and having a piston engageable end portion disposed within said body and an external end portion disposed outside thereof; and return spring means disposed axially compressively between said external end portion of said piston cocking shaft means and said bushing means for urging said cocking shaft means rearwardly.

9. Solder-desolder apparatus comprising:

hollow cylindrical body member having first and second ends;

hollow forward tip member disposed removably within said first end and including an axially forwardly extending solder drawing tube portion;

bushing housing body disposed in second end and being centrally apertured;

piston means disposed at best mainly within said cylindrical body member axially between said first and second ends and including a piston body and guide shaft member affixed thereto and extending coaxially therefrom toward and at least partially through said centrally apertured bushing housing body;

energy storage means coupled to said piston means against which work is done in displacing said piston body forwardly toward said first end;

rearwardly externally extending cocking plunger means movable inwardly responsive to an externally applied manual force and being disposed through said second end and engageable against said piston means for forcefully displacing said piston means forwardly toward said first end against said energy storage means;

externally releasable trigger means carried by said body member in cooperative association with said piston means for holding it time selectively in an axial position toward said first end against said energy storage means;

return means coupled to said cocking plunger means for moving said cocking plunger means axially outwardly while said trigger means retains said piston means toward said first end; and small diameter, elongate electrically energizable soldering tip means carried by said piston means and extending forwardly through said solder drawing tube portion when said piston means is disposed forwardly toward said first end and rearwardly clear therefrom otherwise.

10. The invention according to claim 9 which further includes first and second electrical conductive paths to said soldering tip means, said first path including said trigger means and said guide shaft member and said second path including said piston body and said cylindrical body member.

References Cited

UNITED STATES PATENTS 3,263,889  9/1966  Fortune _____ 228—20

RICHARD H. EANES, JR., *Primary Examiner.*